Patented Nov. 15, 1938

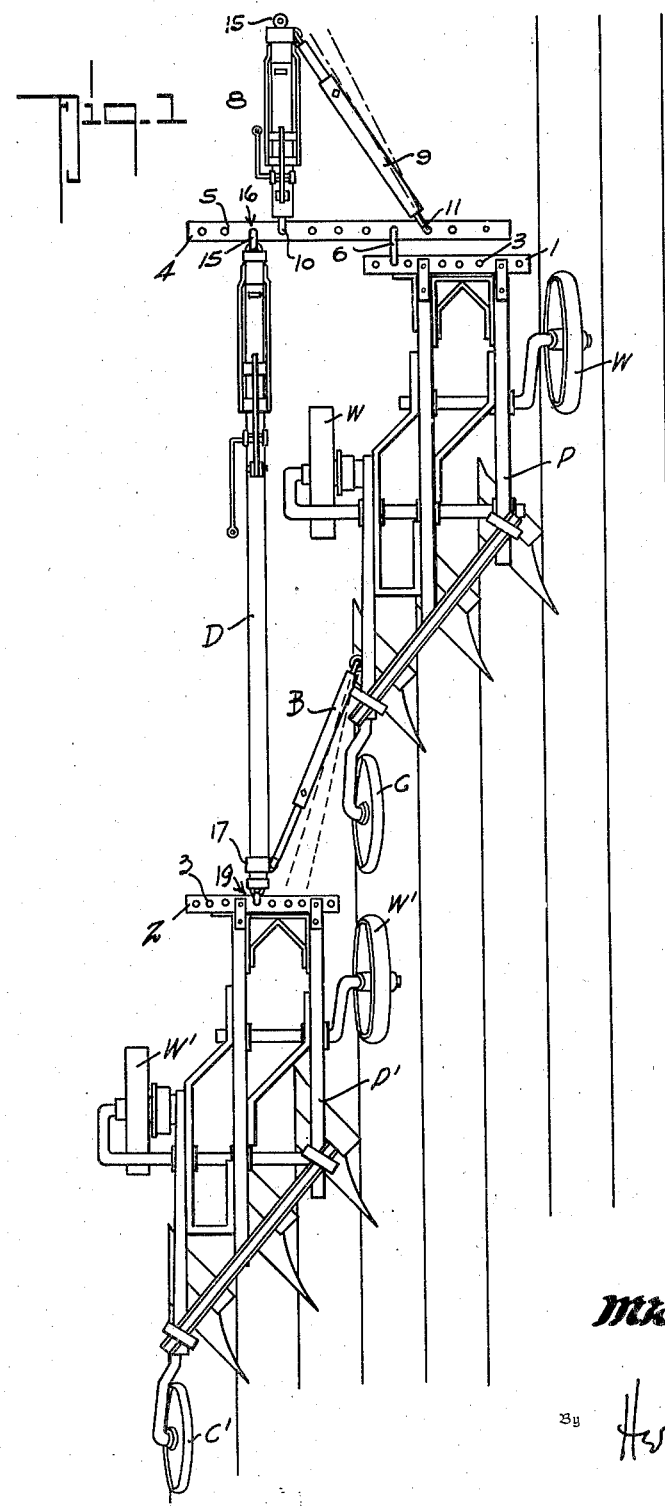

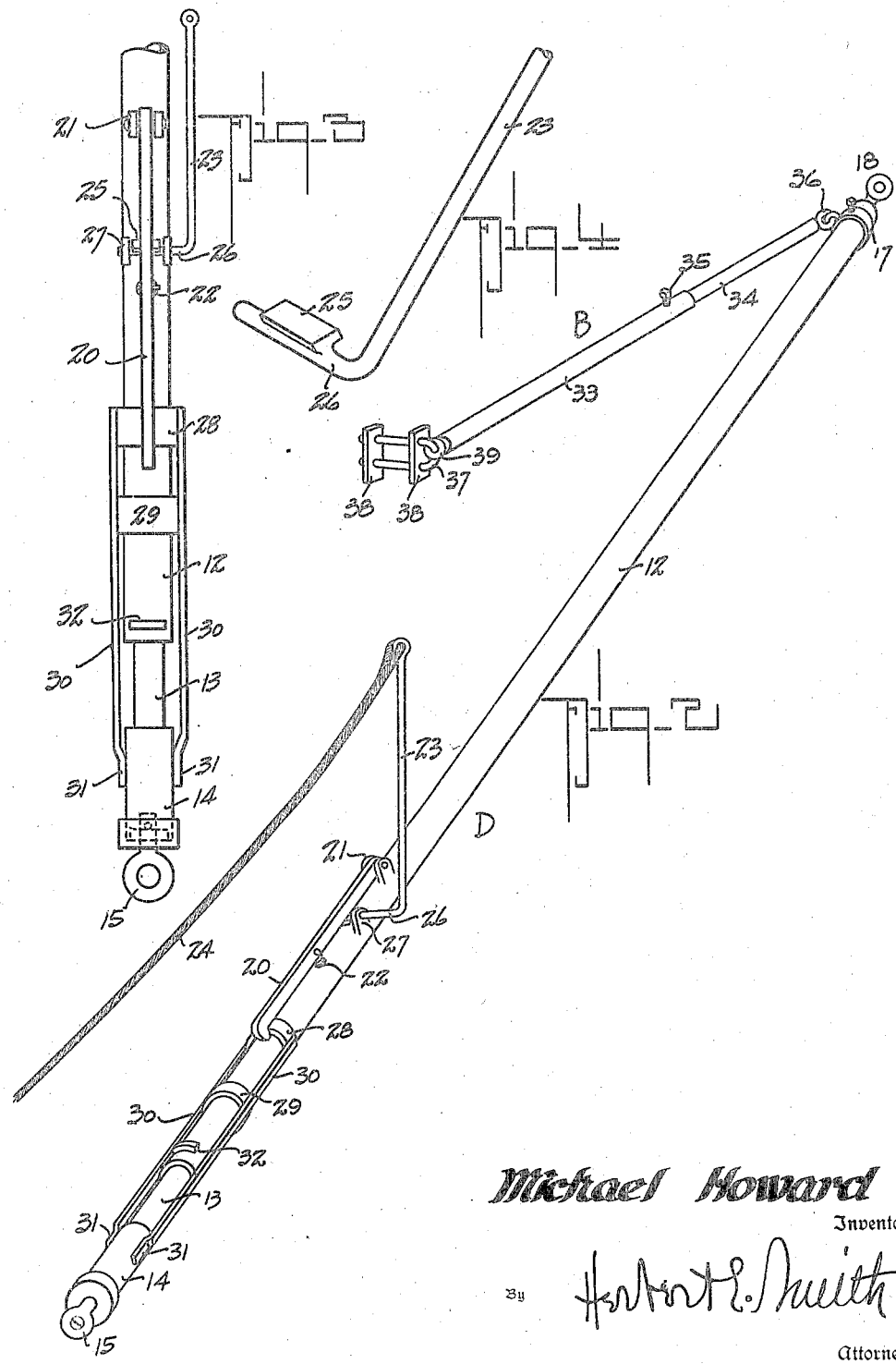

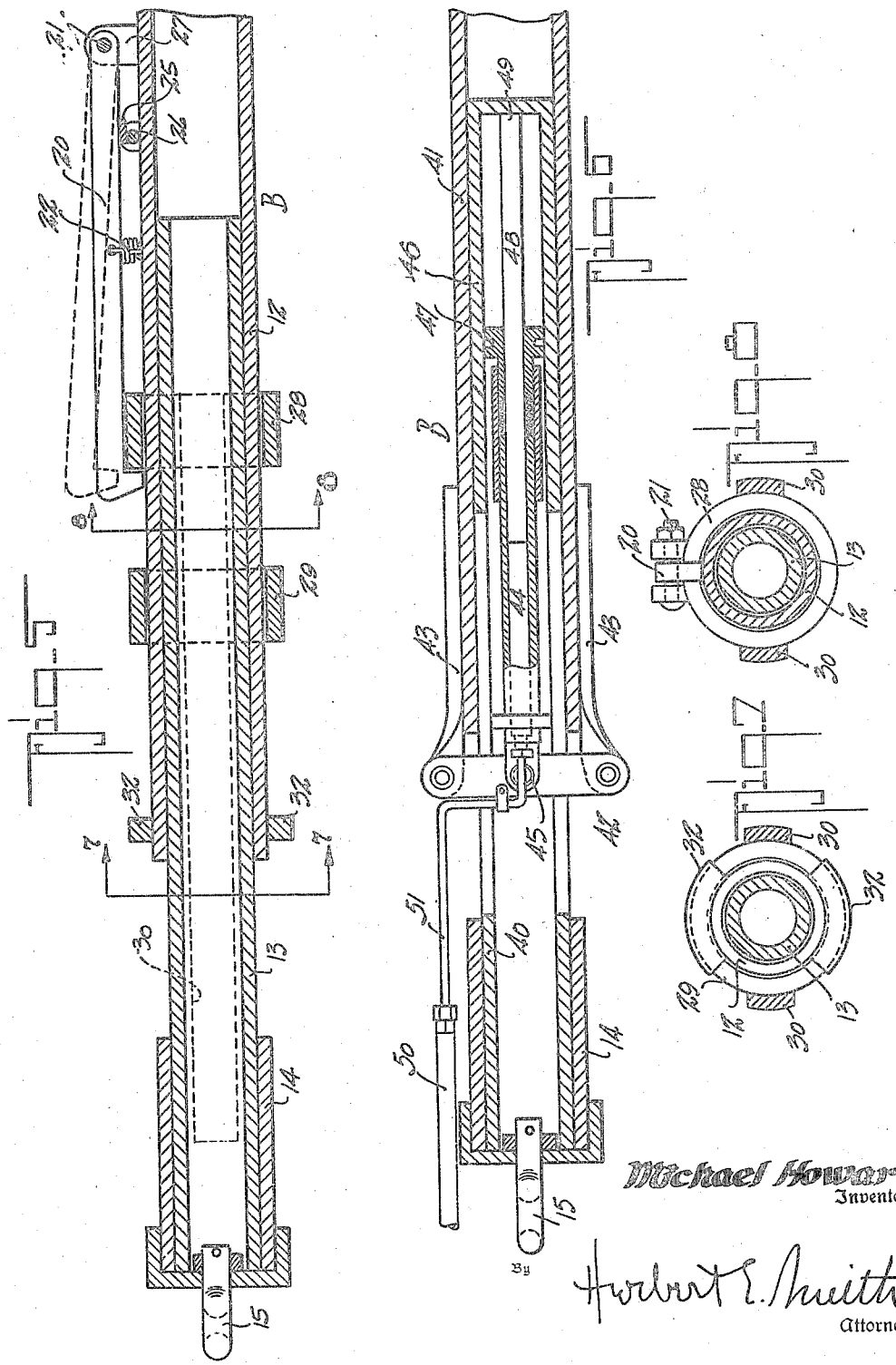

2,136,550

UNITED STATES PATENT OFFICE 2,136,550

GANG PLOW

Michael Howard, Endicott, Wash.

Application August 9, 1937, Serial No. 158,091

7 Claims. (Cl. 97—77)

My present invention relates to improvements in gang plows employing flexibly connected units, and the invention is especially directed to the flexible hitch that is employed between a tractor and the gang plow, as well as between the plow-units of the implement.

As is well known, the trailing units of the gang plow when plowing on a hillside or slope, have a tendency to swing laterally or drift downhill, thereby interrupting the proper spacing of the furrows, and otherwise preventing efficient plowing operations. The primary object of the present invention is the provision of a flexble hitch that may with facility be adjusted in the adaptation of the plows to a slope, thereby enabling the farmer without material loss of time, to change the draft gear of the flexibly connected plow units to suit different conditions in the field being plowed, especially when the field includes hilly surfaces.

The flexible hitch or draft rigging is simple in construction and operation so that changes and adjustments may readily be made in the field by the farmer without recourse to the necessity for using special tools or machinery, and the combination and arrangements of parts involved in the invention insure a smooth and efficient operation of the gang plow under varying conditions of use.

The invention consists in certain novel combinations and arrangements of parts involving essentially an adjustable draft bar or draw bar and an adjustable coupling bar and their accessories in the flexible hitch as will hereinafter be more fully pointed out and claimed. In the accompanying drawings I have illustrated one complete example of the physical embodiment of my invention wherein the parts are combined and arranged according to one mode I have devised for the practical application of the principles of my invention, and in addition I have illustrated fluid pressure operated means for a modified adjustment of the draw bar or draft bar. It will be understood that changes and alterations may be made in these exemplifying structures within the scope of my appended claims without departing from the principles of the invention.

Figure 1 is a plan view of a gang plow employing two plow-units and equipped with the flexible hitches of my invention, one for the tractor, not shown, and the other between the two plow-units.

Figure 2 is a perspective view of the hitch, detached, showing part of the cable or cord employed for unlatching the telescopic draw bar that is adjustable as to its length.

Figure 3 is an enlarged plan view at the forward or front end of the draft bar.

Figure 4 is a detail perspective view of the unlatching lever of the adjustable draft bar.

Figure 5 is a vertical longitudinal sectional view at the front end of the draft bar.

Figure 6 is a view similar to Figure 5 showing fluid pressure operated means for adjusting the draft bar.

Figure 7 is a transverse sectional view at line 7—7; and Figure 8 is a similar view at line 8—8; of Figure 5.

In the general assembly view of Figure 1, I have illustrated a front plow-unit P, and a laterally disposed trailing plow-unit P', both having rigid frames, and adjustable wheel mounts W, W, and W' W', and the usual caster wheels C and C'. Each of the plow units is provided at its front end with a transversely extending hitch bar, as 1 and 2, and these bars are provided with attaching holes 3 extending substantially throughout their length.

In addition to the hitch-bar 1, the front plow-unit P is equipped with a tractor-hitch-bar 4 that extends transversely of the implement, in front of the hitch bar 1, and this bar 4 is also provided with a series of holes as 5, in one of which a coupling link 6 is employed to couple the tractor-hitch bar to the hitch bar 1. The main hitch bar or tractor-hitch bar 4 it will be observed is of a length to extend substantially the full width of the gang of plows in the implement, and this main bar with two points of attachment is connected to a tractor (not shown) by a draft rigging or hitch involving a draft bar indicated as a whole by the numeral 8 in Figure 1, and a diagonal brace indicated as a whole by the numeral 9. At its rear end 10 the draft bar 8 is coupled to the tractor-hitch-bar; the rear end of the diagonal brace 9 is coupled at 11 to the main hitch bar, and the draft bar is attached at 15 to the tractor. The construction and operation of this draft rigging or hitch is substantially the same as the hitch for the plow-units, and it will be understood that the points of attachment 10 and 11 may be varied along the length of the main hitch bar, and further that the lengths of the draft bar and the diagonal brace may be varied to suit the adjustments indicated by dotted lines at the top of Figure 1.

In the flexible draft rigging or hitch for the two plow-units I have indicated the draft bar as a whole by the letter D and the coupling bar as a whole by the letter B, by means of which the plow units are flexibly coupled together and hitched to the main hitch bar 4, so that when the gang plow is operating on a slope at either side, the plows may be adjusted with relation to the tractor and the trailing plow-unit may be adjusted with relation to the front plow-unit to compensate for and prevent a downhill drift of the implement, or of the trailing unit of the gang plow.

The pull of the tractor is directly through the main hitch bar 4 and link 6 to the forward unit P, and the pull on the trailing unit P' from the tractor hitch bar 4 is through the extensible or longitudinally adjusted draw bar D from the main hitch bar to the hitch bar of the trailing plow unit P'. The two plow units are flexibly coupled together by the coupling bar B loosely connected at its ends to the front plow unit and to the rear end of the draw bar, for the purpose of a radius rod that maintains the draw rod in parallelism with the front plow unit P.

Both the draft bar and the coupling bar are of the telescopic type so that their lengths may readily be varied of the trailing plow unit, to maintain the wheel W' of the trailing unit in line with the caster wheel C of the front unit, and cause all of the plows to follow their properly spaced paths and form parallel rows or furrows as indicated in Figure 1. This adjustment is accomplished by changing the point of attachment of the draw bar to the hitch bar 3, which is to the left of the center of the hitch bar in Figure 1 where the hitch or draft rigging has been adjusted to compensate for a downward slope to the right. In this adjustment the lengths of the draft bar and the diagonal brace are varied, and the angle of the coupling bar with relation to the draft bar is changed, as indicated by dotted lines, to hold the draft bar parallel with the front unit, and the trailing unit in longitudinal alinement with the draft bar.

The extensible draw bar D comprises a rear tubular section 12 and a front tubular section 13, the latter having an exterior cap or head 14 and a coupling eye or eye-bolt 15 which is coupled at 16 to the main tractor hitch bar 4.

The larger, rear section 12 is provided with an end cap or head 17 and an eye-bolt 18 which is coupled at 19 to the hitch bar 2 of the trailing plow-unit P'. The tube section 13 is adapted to slide within the outer tubular section 12 for the purpose of contracting and expanding the length of the draw bar D, and a lever latch 20 is provided to retain the sections in pulling position. The lever latch is pivotally mounted at 21 on and it extends longitudinally of the tube-section 12, and a spring 22 anchored to the tube section and to the lever latch holds the latch in parallelism with the tube section. By means of an operating lever 23 and its cable 24, the lever latch may be lifted to release position against the tension of spring 22, through the instrumentality of a lifting lug or cam 25 on the pivot arm 26 of the operating lever. The pivot arm 26 is journaled in a bearing 27 of the section 12 between the hinge 21 and the spring 22, and it will be apparent that by means of a hand-pull on the cable or cord the latch may be disengaged from one or the other of a pair of spaced collars 28 and 29 that loosely surround the tubular section 12.

These latching collars 28 and 29, which also brace the connection between the two sections 12 and 13, are rigid with a pair of side arms 30, 30 that extend beyond the end of the tube 12 parallel with the tube 13, and at 31 these arms are rigidly fixed to the exterior face of the cap 14 of the tube section 13. Stop lugs 32 at the end of the section 12 limit the telescoping movement or adjustment of the section 13 within the section 12.

The coupling bar B is also composed of telescoping tubular sections at 33 and 34 that are held in adjusted position by means of a set bolt 35 threaded through the section 33 and engaging the section 34 in well known manner.

At one end the coupling bar is loosely connected at 36 to the rear end of the draft bar D near its point of attachment to the hitch bar 2 of the plow unit P', and at its other end the coupling bar is attached or fastened by a U-bolt 37, plates 38, and an eye-bolt 39 to the main frame of the front plow unit P.

In adjusting the draft rigging, the latch rope or release cable 24 is controlled by hand, and the tractor may be employed for moving the front plow unit with relation to the trailing unit and simultaneously varying the length of the draft bar and the coupling bar, and of course, the point of attachment 19 is changed by hand for the desired adjustment.

In the modified form of the invention in Figure 6 a hydraulic arrangement is provided for extending and contracting the length of the draw bar, and in this construction the inner tube section 40, which slides within the outer section 41, is slotted to receive a cross-head 42 that is rigidly supported from the tube section 41 by side arms 43, and a central oil-cylinder 44 is secured at 45 centrally of the transverse head 42.

The oil cylinder 44 projects into the tube section 41 and it is provided with an exterior bushing 46 and an annular exterior guide head 47 within the tube section 41, said head closing and packing the inner end of the cylinder, as shown. A relatively stationary, central bar 48 is fixed at one end 49 to the tube section 40, and the free end of this bar projects through the packing head 47 and a substantial distance into the oil cylinder 44. Oil under pressure is supplied to the interior of the cylinder 44 from a suitable source through the supply pipe 50 and thence through a branch pipe 51 to one end of the oil cylinder, and it will be apparent that fluid pressure applied against the free end of the piston 48 will cause the section 40 to slide outwardly with relation to the section 41 thereby extending the length of the draft bar. When fluid pressure is withdrawn from the hydraulic-ram arrangement thus described the length of the draw bar may be contracted as desired.

Having thus fully described my invention, what I claim as new and desire to secure by Letters Patent is:

1. In a hitch for a gang-plow, the combination with a main hitch-bar, and a pair of plow-units each having a hitch-bar one of which is flexibly connected to the main hitch bar, of a draw bar detachably connected to the main hitch bar and to the hitch bar of the trailing unit, and a coupling bar forming a brace between the front plow-unit and the draw bar, whereby the draw bar and the trailing plow-unit are maintained in longitudinal alinement.

2. In a hitch for a gang-plow, the combination with a main hitch bar, and a pair of plow-units each having a hitch bar, and an adjustable link connection between the main hitch bar and the front plow-unit, of a draw-bar laterally adjustable with relation to the front plow-unit, detachable means for fastening the front end of said draw bar to the main hitch-bar and detachable means for fastening the rear end of the draw bar to the hitch-bar of the trailing plow-unit, and a brace flexibly coupling the draw bar with the front plow unit, whereby the draw bar is maintained in parallelism with the front plow unit.

3. In a hitch for a gang plow, the combination with a main hitch-bar, a pair of plow units each having a hitch bar, and an adjustable link connection between the main hitch bar and the front hitch bar, of an extensible draw bar detachably connected to the main hitch bar and the rear hitch bar, an extensible brace coupling the draw bar with the front plow unit, and means for laterally adjusting the draw bar with relation to its supporting hitch bars.

4. In a draft rigging for a gang-plow, the combination with a main hitch bar having a series of longitudinally extending holes, a pair of plow units each having a hitch bar and a longitudinally extending series of holes in said bars, and a link connection between the front hitch bar and the main hitch bar, of a longitudinally adjustable draw bar having couplings at its ends to the main hitch bar and to the rear hitch bar, a longitudinally adjustable diagonal brace, and couplings at the ends of said brace to the front plow unit and to the rear end of the draw bar.

5. In a draft rigging for a gang plow, the combination with a main hitch bar, a pair of plow units each having a hitch bar, and a link connection between the main hitch bar and the front hitch bar, of a sectional telescopic draw bar and means for holding it in extended position, couplings at the ends of said draw bar to the main hitch bar and to the rear hitch bar, means for adjusting said couplings laterally of the front plow unit, a sectional telescopic diagonal brace and means for holding said brace in adjusted position and flexible connections between the ends of said brace and the front plow-unit and said draw bar respectively.

6. In a draft rigging for a pair of plow-units, the combination with a main hitch bar, a front hitch bar linked to the main hitch bar, and a rear hitch bar, of a draw bar having couplings at its ends to the main hitch bar and the rear hitch bar, and a diagonal brace coupled at its ends to the front plow unit and said draw bar whereby the draw bar is maintained in longitudinal alinement with the rear plow unit and in parallelism with the front plow unit.

7. In a draft rigging for a gang plow, the combination with a main hitch bar, a pair of plow units each having a hitch bar, and a link connection between the main hitch bar and the front hitch bar, of a telescopic draw bar comprising a section having rigid spaced collars, a second section having a lever-latch mounted thereon for selective engagement with said collars, couplings at the ends of the draw bar to the main hitch bar and the rear hitch bar, a sectional telescopic coupling bar between the front plow unit and said draw bar, and means for holding said coupling bar in adjusted position.

MICHAEL HOWARD.